United States Patent
Mannhart

(10) Patent No.: US 6,681,797 B2
(45) Date of Patent: Jan. 27, 2004

(54) PRESSURE TRANSDUCER

(75) Inventor: Eugen Mannhart, Cham (CH)

(73) Assignee: ESEC Trading SA, Cham (CH)

( * ) Notice: Subject to any disclaimer, the term of this patent is extended or adjusted under 35 U.S.C. 154(b) by 0 days.

(21) Appl. No.: 10/150,239

(22) Filed: May 16, 2002

(65) Prior Publication Data

US 2002/0170600 A1 Nov. 21, 2002

(30) Foreign Application Priority Data

May 16, 2001 (CH) ................................. 0927/01

(51) Int. Cl.[7] ................................................ G05D 7/06
(52) U.S. Cl. ................. 137/487.5; 251/80; 251/129.13; 118/684
(58) Field of Search ................. 137/487.5; 251/77, 251/80, 129.11, 129.13; 118/684, 692

(56) References Cited

U.S. PATENT DOCUMENTS

| | | | |
|---|---|---|---|
| 3,596,873 A | | 8/1971 | Eufusia ................. 251/140 |
| 4,428,398 A | * | 1/1984 | Mito et al. .............. 137/530 |
| 4,791,954 A | | 12/1988 | Hasegawa ............... 137/487.5 |
| 4,922,852 A | * | 5/1990 | Price ..................... 118/683 |
| 5,312,016 A | * | 5/1994 | Brennan et al. ......... 137/487.5 |

FOREIGN PATENT DOCUMENTS

| | | | |
|---|---|---|---|
| DE | 87 16 781 | 5/1989 | |
| DE | 195 24 652 | 1/1997 | |
| EP | 0928 637 A2 | 1/1999 | ......... B05C/5/02 |
| GB | 1 386 172 | 3/1975 | |
| JP | 57057215 | 6/1982 | ......... G01D/5/60 |
| WO | 91/07712 | 5/1991 | |

* cited by examiner

Primary Examiner—John Rivell
Assistant Examiner—Ramesh Krishnamurthy
(74) Attorney, Agent, or Firm—Thelen Reid & Priest LLP; David B. Ritchie

(57) ABSTRACT

A pressure transducer for the production of a controlled under or overpressure comprises a valve to which compressed air can be applied, a motor for adjusting the position of the valve block, a sensor for measuring the pressure to be controlled and an electronic controller. The valve comprises a valve block working together with a valve seat. The rotational movement of the shaft of the motor is converted into a longitudinal movement of the valve block by means of a coupling. Between the shaft of the motor and the valve block, a spring is inserted which applies a mechanical load to the motor so that the motor does not reach the set speed given by the controller but turns slower. The load on the motor is dependent on the position of the valve block. For the controller, this is equivalent to a linearization of the characteristic curve of the regulated system.

12 Claims, 1 Drawing Sheet

PRESSURE TRANSDUCER

PRIORITY CLAIM

The present application claims priority under 35 U.S.C §119 based upon Swiss Patent Application No. 2001 0927/01 filed May 16, 2001.

FIELD OF THE INVENTION

The invention concerns a pressure transducer.

BACKGROUND OF THE INVENTION

With the mounting of semiconductor chips, the semiconductor chips are bonded to the substrate with an epoxy adhesive. In doing so, it is necessary that a precisely determined amount of adhesive is applied to the substrate. Application of the adhesive takes place for example with a dispensing nozzle as is described in the European patent application EP 928637. The adhesive in the dispensing nozzle is pushed out in cycles by means of pressure pulses. The pressure pulse comprises an overpressure and an underpressure or vacuum phase. The vacuum phase always continues up to the next overpressure phase. It is necessary in order to prevent the adhesive from running out. The strength of the vacuum in this end phase is dependent on the characteristics of the adhesive and is given for each type of adhesive. Production of the vacuum is achieved for example with a device comprising a needle valve and a venturi nozzle connected downstream. The vacuum produced in this way is very non-linearly dependent on the position of the needle valve. In dynamic operation therefore, regulation of the vacuum is very difficult.

The object of the invention is to find a solution for regulating the vacuum of such a device.

BRIEF DESCRIPTION OF THE INVENTION

A pressure transducer comprises a valve to which compressed air can be applied which has a valve block which works together with a valve seat, a motor for changing the position of the valve block and with it the pressure at the valve outlet, a sensor for measuring the pressure to be regulated and an electronic controller. The motor has a rotatable shaft the direction of rotation and speed of which are regulated by the electronic controller based on a set value and the signal delivered by the pressure sensor. The rotational movement of the shaft is transmitted into a longitudinal motion of the valve block via a coupling. The pressure transducer in accordance with the invention is characterised in that a spring is inserted between the shaft and the valve block. When the valve is closed, the spring is relieved or slightly pre-tensioned. The more the valve opens, the more strongly the spring is compressed: The spring exerts a force on the shaft which is dependent on the position of the valve block. It therefore puts a mechanical load on the motor. The characteristics of the motor are selected so that the mechanical load leads to the motor turning not with the speed given by the controller but with a lower speed. For the controller, this means a linearisation of the control characteristic. A needle valve is preferably used as the valve and the motor is preferably a DC motor.

In a preferred embodiment the pressure transducer comprises

- a valve with an inlet for applying compressed air, the valve comprising a valve block and a valve seat,
- a DC motor for adjusting the position of the valve block with regard to the valve seat,
- means for transforming a rotating motion of a shaft of the motor into a longitudinal movement of the valve block,
- a pressure sensor,
- an electronic controller for regulating a direction of rotation and a speed of the motor based on a signal delivered by the pressure sensor and a set value for the pressure, and
- a spring inserted between the shaft of the motor and the valve block for effecting a varying mechanical load on the motor in dependence on the position of the valve block, wherein an increasing mechanical load on the motor effects an increasing reduction in the speed of the motor in comparison with its speed in a no-load condition.

The pressure transducer can also be used for producing a vacuum in that a device for producing a vacuum, for example a venturi nozzle, is connected downstream of it. In this case, the sensor is preferably used for measuring the vacuum so that the regulated system not only comprises the valve but also the venturi nozzle.

The term pressure transducer means not only devices for producing a controlled overpressure but also devices for producing a controlled underpressure or vacuum.

In the following, an embodiment of the invention is explained in more detail based on the drawing.

In the following, embodiments of the invention are explained in more detail based on the drawing.

BRIEF DESCRIPTION OF THE DRAWING FIGURES

The accompanying drawings, which are incorporated into and constitute a part of this specification, illustrate one or more embodiments of the present invention and, together with the detailed description, serve to explain the principles and implementations of the invention. The figures are not to scale.

DETAILED DESCRIPTION OF THE INVENTION

Figure 1:
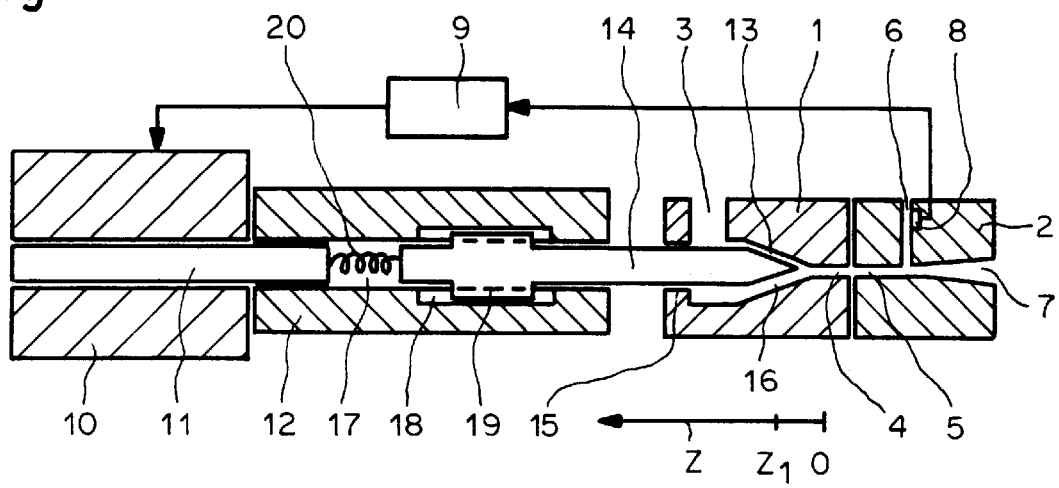
FIG. 1 shows a pressure transducer.

FIG. 1 shows a pressure transducer in the form of a device operated with compressed air for the production of a controlled underpressure or vacuum which can also be referred to as the vacuum source. The pressure transducer comprises a valve, preferably a needle valve 1 and a venturi nozzle 2. The needle valve 1 has an inlet 3 to which compressed air can be applied and an outlet 4 which feeds a first input 5 of the venturi nozzle 2. The venturi nozzle 2 has a second input 6 where the vacuum produced applies and an output 7 via which the air fed from the needle valve 1 is released to the environment. A vacuum sensor 8, a drive for adjusting the needle valve 1 as well as an electronic controller 9 are present for controlling the vacuum. The drive comprises a motor 10, preferably a dc motor, with a rotating shaft 11 and a coupling 12 secured to the shaft 11. The needle valve 1 has a valve seat 13 into which a valve body formed as a needle 14 engages. The needle 14 has an air-tight bearing in the needle valve 1 via a screw thread 15. On turning the needle 14, the gap 16 formed between the tip of the needle 14 and the valve seat 13 changes which determines the pressure loss of the needle valve 1 and therefore the pressure at the first input 5 of the venturi nozzle 2. The coupling 12 has a longitudinal drill hole 17 and two slits 18 running parallel to it. The longitudinal drill hole 17 accepts the end of the needle 14 facing away from the valve seat 13 whereby two wings 19 secured to the needle 14 project into the slits 18. The rotating motion of the shaft 11 of the motor 10 is transmitted to the needle 14 via the wings 19 guided in the slits 18 of the coupling 12 and, because of the bearing of the needle 14 in the screw thread 15 of the needle valve 1, is transformed into a longitudinal movement of the needle 14.

The electronic controller 9 delivers a direct voltage at its output the polarity of which determines the direction of rotation of the motor 10 and the rate of which controls the speed. A relatively low voltage means that the motor 10 turns slowly. The speed of the motor 10 increases with increasing voltage. The motor 10 has the characteristic that it only runs when the voltage exceeds a threshold value.

Figure 2:
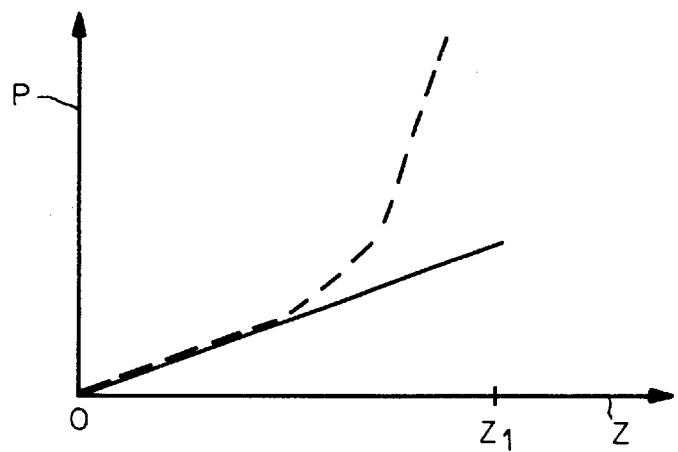
FIG. 2 shows two characteristic curves.

The characteristic curve p(z), whereby the value z denotes the position of the tip of the needle 14 in the direction of its longitudinal axis z and the value p the pressure at the output of the venturi nozzle 2, shows the progression presented as a broken curve in FIG. 2. When the needle valve 1 is closed, z=0. In the working range, the characteristic curve is strongly non-linear which makes the dynamic control of the vacuum difficult. In accordance with the invention, it is therefore foreseen to insert a spring 20 into the coupling 12 between the shaft 11 and the needle 14 which exerts a force dependent on the position z of the needle 14 onto the face of the (axially not movable) shaft 11 therefore loading the motor 10 mechanically. With z=0 the spring 20 is either completely relieved or already slightly compressed. With $z=z_1$ on the other hand, the spring 20 is comparatively strongly compressed: The load on the motor 10 increases linearly within the working range of the needle 14 from z=0 to $z=z_1$. The dc motor 10 and the force created by the spring 20 in the working range of the needle 14 are co-ordinated in such a way that an increasing mechanical load effected by the spring 20 causes an increasing reduction in the speed of the motor 10. The degree of the reduction in speed depends on the one hand on the spring constant of the spring 20 and, on the other hand, on the characteristics of the dc motor 10. As the motor therefore, a dc motor is selected the speed of which reduces on mechanical loading of its shaft in comparison with the speed in the no-load condition.

In operation, the electronic controller 9 regulates the vacuum in that it controls the direction of rotation and the set speed of the motor 10 based on the signal of the vacuum sensor 8. Because, depending on the position of the needle 14, the shaft 11 of the motor 10 is mechanically loaded by the spring 20, the shaft of the motor 10 does not turn with the set speed given by the electronic controller 9 but with a speed lower in comparison with the set speed. This leads to the following control behaviour: In the lower range of the characteristic curve where z is small (in the left-hand area in FIG. 2), the load on the motor 10 is relatively low and the motor turns at almost its given set speed. In the upper area of the characteristic curve where z is comparatively large (in the right-hand area in FIG. 2), the load on the motor 10 is relatively high and the motor 10 turns considerably slower than with its set speed. For the electronic controller 9 this is equivalent to a linearisation of the characteristic curve p(z) and, for the electronic controller 9, it appears as though the characteristic curve has a progression such as that presented as an extended line in FIG. 2. With such an at least partially linearised characteristic curve, the vacuum at the second input 6 of the venturi nozzle 2 can be regulated by a controller 9 designed as a conventional PI controller.

On applying adhesive on a Die Bonder, the working range of the vacuum source lies typically in the range of 0 to 70 mbar.

The same arrangement can also be used, without venturi nozzle, for the production of a controlled overpressure at the output 4 of the needle valve 1. For this purpose, instead of the vacuum sensor 8, a pressure sensor is necessary which measures the pressure at the output 4 of the needle valve 1 and passes it on to the controller 9.

I claim:

1. Pressure transducer for producing a controlled pressure, comprising
   a valve with an inlet for applying compressed air, the valve comprising a valve block and a valve seat,
   a motor for adjusting the position of the valve block with regard to the valve seat,
   means for transforming a rotating motion of a shaft of the motor into a longitudinal movement of the valve block,
   a pressure sensor,
   an electronic controller for regulating a direction of rotation and a speed of the motor based on a signal delivered by the pressure sensor and a set value for the pressure, and
   a spring inserted between the shaft of the motor and the valve block for effecting a varying mechanical load on the motor in dependence on the position of the valve block, wherein an increasing mechanical load on the motor effects an increasing reduction in the speed of the motor in comparison with its speed in a no-load condition.

2. Pressure transducer according to claim 1, wherein the motor is a DC motor.

3. Pressure transducer according to claim 1, wherein the valve is a needle valve.

4. Pressure transducer according to claim 2, wherein the valve is a needle valve.

5. Pressure transducer according to claim 1, further comprising a device for producing an underpressure connected downstream of the valve, wherein the sensor measures the underpressure.

6. Pressure transducer according to claim 2, further comprising a device for producing an underpressure connected downstream of the valve, wherein the sensor measures the underpressure.

7. Pressure transducer according to claim 3, further comprising a device for producing an underpressure connected downstream of the valve, wherein the sensor measures the underpressure.

8. Pressure transducer according to claim 4, further comprising a device for producing an underpressure connected downstream of the valve, wherein the sensor measures the underpressure.

9. Pressure transducer according to claim 5, wherein the device for producing the underpressure is a venturi nozzle.

10. Pressure transducer according to claim 6, wherein the device for producing the underpressure is a venturi nozzle.

11. Pressure transducer according to claim 7, wherein the device for producing the underpressure is a venturi nozzle.

12. Pressure transducer according to claim 8, wherein the device for producing the underpressure is a venturi nozzle.

* * * * *